US006025786A

United States Patent [19]

Rayford

[11] Patent Number: 6,025,786
[45] Date of Patent: Feb. 15, 2000

[54] TRANSMITTER FOR REMOTE CONVENIENCE SYSTEM HAVING COILED, EXTENDABLE ANTENNA

[75] Inventor: Joan F. Rayford, Livonia, Mich.

[73] Assignee: TRW Inc., Lyndhurst, Ohio

[21] Appl. No.: 09/073,520

[22] Filed: May 6, 1998

[51] Int. Cl.[7] .................................................... H04Q 7/00

[52] U.S. Cl. .................................... 340/825.31; 343/877

[58] Field of Search .................................. 343/718, 877, 343/901, 903, 702; 340/825.31; H04Q 7/00

[56] References Cited

U.S. PATENT DOCUMENTS

| | | | |
|---|---|---|---|
| 1,106,729 | 8/1914 | Rouzet . | |
| 5,281,970 | 1/1994 | Blaese | 341/176 |
| 5,446,469 | 8/1995 | Makino | 343/702 |
| 5,534,878 | 7/1996 | Johnson | 343/702 |
| 5,835,070 | 11/1998 | Scaraglino | 343/877 |
| 5,864,297 | 1/1999 | Sollestre et al. | 340/825.31 |

*Primary Examiner*—David H. Vu
*Assistant Examiner*—Shih-Chao Chen
*Attorney, Agent, or Firm*—Tarolli, Sundheim, Covell, Tummino & Szabo L.L.P.

[57] ABSTRACT

A transmitter (12) for a remote control convenience system (10) has a housing (22). A pushbutton (e.g., one of 24–30) is located on the sousing (22) and is manually actuatable for requesting remote control performance of a function by a remotely located receiver (14). Transmit circuitry (32) of the transmitter (12) is located within the housing (22) and is operatively connected to the pushbuttons (e.g., one of 24–30). The transmit circuitry (32) outputs an electrical signal that conveys a message requesting performance of the function in response to actuation of the pushbutton. A flexible antenna (34) is operatively connected to receive the electrical signal from the transmit circuitry (32) and to output a signal (18) intended for reception by the receiver (14). The antenna (34) has a stored position coiled inside the housing (22) and an extended position extending outside of the housing. A rotatable spool (42) supports the antenna (34) within the housing (22), and permits extension and retraction of the antenna relative to the housing (22).

10 Claims, 2 Drawing Sheets

TRANSMITTER FOR REMOTE CONVENIENCE SYSTEM HAVING COILED, EXTENDABLE ANTENNA

FIELD OF THE INVENTION

The present invention relates to transmitters for remote convenience systems, and is particularly directed to transmitters for increasing the distance across which a remote convenience function is controlled.

BACKGROUND OF THE INVENTION

Remote convenience systems are known in the art. Such remote convenience systems permit remote control of certain functions. One type of a remote convenience system is for remotely controlling vehicle functions. Other example types of remote convenience systems include garage door opener systems and entry light activation systems.

Examples of remotely controlled functions for vehicles include locking and unlocking of one or more vehicle doors. A remote convenience vehicle system that permits remote locking and unlocking functions is commonly referred to as a remote keyless entry ("RKE") system.

Such remote convenience vehicle systems may provide for control of other vehicle functions. For example, a remote vehicle locator function may be provided. The vehicle locator function causes the vehicle horn to emit a horn chirp and/or the headlights of the vehicle to flash. This allows a person to quickly locate their car within a crowded parking lot.

Known remote convenience vehicle systems include a receiver/controller mounted in an associated vehicle and at least one portable, hand-held transmitter located remote from the receiver. The receiver/controller has a memory that stores one or more security codes, each of which is associated with a transmitter that is authorized to cooperate with the receiver/controller mounted in the vehicle. Also, the receiver/controller is operatively connected to one or more vehicle systems that perform the functions that are remotely requested.

Each transmitter is provided with one or more manually actuatable switches. Each transmitter switch is associated with a remote control vehicle function to be performed. The transmitter includes circuitry that responds to the actuation of each switch to transmit a message in the form of a digital signal. The transmitted digital signal also includes the appropriate security code. When the receiver/controller receives such a digital signal, it compares the security code portion of the received signal against its stored security code, and, if a match is found, a controller portion of the receiver/controller outputs a signal to the proper system (e.g., the door lock actuators) of the vehicle for causing performance of the requested function (e.g., unlock door).

Portable transmitters of remote convenience systems transmit signals in the ultra-high frequency ("UHF") portion of the radio frequency ("RF") spectrum. Specifically, the frequency of the transmitted signals for such systems is in the portion of the RF spectrum that is allotted by the Federal Communications Commission ("FCC") for unlicensed transmission devices. FCC regulations stipulate that such unlicensed devices can not have a transmitted signal strength that exceeds a predetermined maximum value.

It is often desirable to accomplish remote control performance of certain functions at a longest possible distance. One example of such a function is the remote vehicle locator function. To illustrate such a scenario, consider a shopping mall patron exiting a shopping mall building and being faced with the task of locating their car within a vast shopping mall parking lot. It would be beneficial to be able to actuate the remote vehicle locator function from a location near the exit door of the shopping mall, before proceeding into the parking lot. Because of FCC regulations, an increase of transmitter power above the set limit is not possible.

SUMMARY OF THE INVENTION

In accordance with the present invention, a remote convenience transmitter is provided having an extended broadcast range without an increase in transmitter power. The transmitter includes an extendable coiled antenna that is extended prior to signal transmission thereby increasing broadcast range.

In accordance with one aspect, the present invention provides a transmitter unit for a remote control convenience system. The transmitter unit includes a housing and at least one selector located on the housing and manually actuatable for requesting remote control performance of a function by a remotely located receiver. Transmit circuitry is located within the housing and is operatively connected to the at least one selector for outputting an electrical signal in response to actuation of the at least one selector. The signal conveys a message requesting performance of the function. A flexible antenna is operatively connected to receive the electrical signal from the transmit circuitry. The antenna outputs a signal intended for reception by the receiver that conveys the message requesting performance of the function. The antenna has a stored coiled position inside the housing and an extended position extending outside of the housing. Means mounts the antenna to the housing and permits withdrawal and retraction of the antenna relative to the housing between the stored coiled position and the extended position.

In accordance with another aspect, the present invention provides a method of requesting remote control performance of a convenience function by a receiver. A pull element of a remote control transmitter is anchored. A housing of the transmitter is grasped. The pull element is pulled relative to the housing so that the housing and the pull element move apart so as to extend a stored coiled antenna that has one end connected to the anchored pull element. A selector located on the housing that corresponds to the desired remote convenience function is actuated. In response thereto, a signal is transmitted from the extended antenna that is intended for the receiver. The signal conveys a message requesting performance of the remote convenience function.

BRIEF DESCRIPTION OF THE DRAWINGS

The foregoing and other features and advantages of the present invention will become apparent to those skilled in the art to which the present invention relates from a reading of the following detailed description of the preferred embodiment with reference to the accompanying drawings, in which.

DESCRIPTION OF PREFERRED EMBODIMENTS

Figure 1:
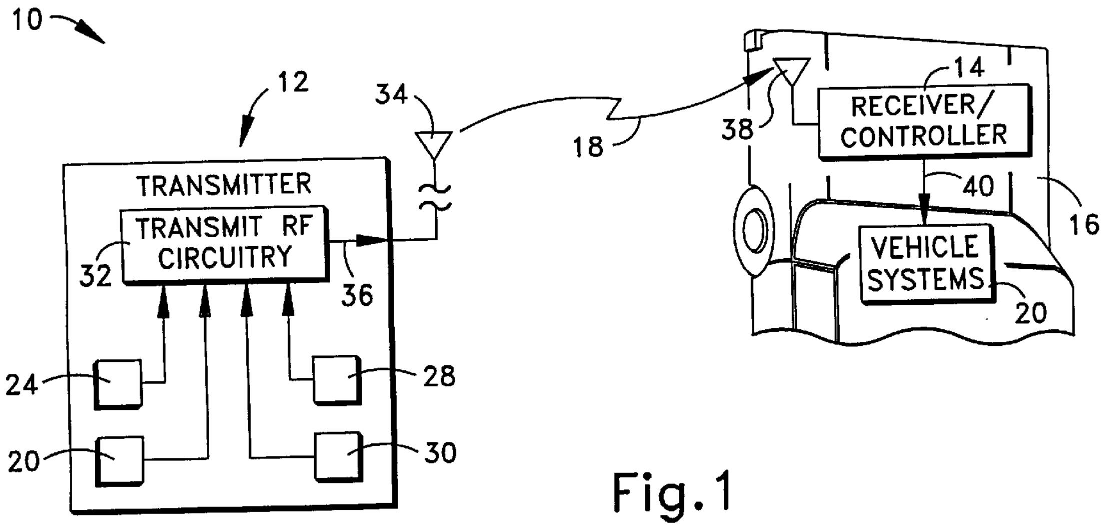
FIG. 1 is a schematic illustration of a remote convenience vehicle system that includes a transmitter in accordance with the present invention.

A remote convenience vehicle system 10 is schematically shown in FIG. 1. The system 10 includes a transmitter unit 12 (hereinafter referred to as the "transmitter 12"), and an associated receiver/controller unit 14 (hereinafter referred to as the "receiver/controller 14") mounted in a vehicle 16. The transmitter 12 is operable to communicate, via a signal 18, with the receiver/controller 14 to achieve remote control performance of at least one convenience function of a vehicle system 20 (e.g., vehicle door lock actuator) in the vehicle 16. The transmitter 12 is operated when it is desired to cause performance of the requested remote convenience function at the vehicle 16.

The transmitter 12 is a portable hand-held unit that has a housing 22 (FIG. 2) that encloses its electronic components. The transmitter 12 includes at least one manually actuatable pushbutton selector switch. In the example shown in the Figures, there are four pushbutton selector switches. A first pushbutton switch 24 and a second pushbutton switch 26 are associated with vehicle door lock and unlock functions, respectively. A third pushbutton switch 28 is associated with a vehicle alarm or "panic" function. A fourth pushbutton switch 30 is associated with a vehicle locate or "find" function. It will be appreciated that the system 10 could be configured to control different remote convenience functions, and that the transmitter structure (e.g., the number, type, and location of pushbuttons on the transmitter 12) would be accordingly different.

Each actuation, or predefined series of actuations, of one of the pushbuttons (e.g., 24) of the transmitter 12 is a request to perform the corresponding predefined remote convenience function. For example, actuating pushbutton 24 is a request to lock the doors of the vehicle 16 (FIG. 1). The pushbuttons 24–30 are operatively connected to a transmit radio-frequency (RF) circuitry 32 within the housing 22 of the transmitter 12. The transmit circuitry 32 is, in turn, operatively connected to a broadcast transmission antenna 34. The antenna 34 is schematically illustrated in FIG. 1.

In response to pushbutton actuation, the transmit circuitry 32 generates/assembles a "packet" of information to be transmitted. The transmission packet includes at least one command that represents the remote function request, and a security code. The transmit circuitry 32 then provides an appropriate electrical signal 36 that conveys the transmission packet to the antenna 34. In response to the stimulus of the electrical signal 36, the antenna 34 broadcasts the signal 18, which is intended to be "picked-up" at an antenna 38 of the receiver/controller 14 at the vehicle 16.

The antenna 38 provides an electrical signal to the receiver/controller 14 that conveys the contents (e.g., the function request message, the security code from the transmitter 12) of the received signal 18. Within the receiver/controller 14, the information is processed to determine if the received signal 18 includes a proper security code and to determine the function that is requested. If the signal 18 includes the proper security code, the receiver/controller 14 provides an appropriate signal 40 to the corresponding vehicle system 20 (e.g., the door lock actuator system, the horn system, or the lights system) to cause performance of the requested function.

With regard to the convenience functions that are remotely controlled via the system 10, the person of ordinary skill in the art will understand the operation of such functions as they are known in the art. Accordingly, a detailed description of the components and circuitry associated with such systems is not provided herein for brevity. Also, it will be appreciated that the present invention is applicable to other non-automotive, remotely controlled functions (e.g., garage door opening, or entry light activation).

Figure 3:
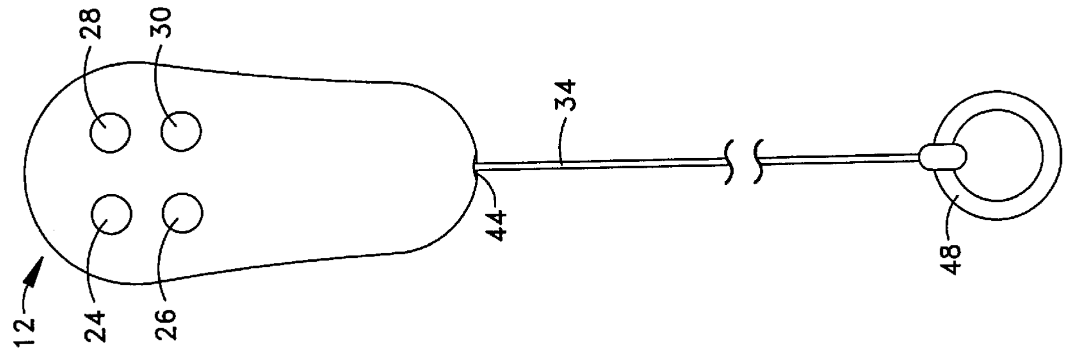
FIG. 3 is an illustration similar to FIG. 2, but shows the antenna in an extended uncoiled position.

Often it is desirable to remotely control a function across a relatively large distance. Thus, the antenna 34 of transmitter 12 is extendable (FIG. 3), in accordance with the present invention, from the housing 22 of the transmitter 12. The antenna 34 includes a flexible wire that has a length that is several times longer than the housing 22 of the transmitter 12. Hereinafter, the antenna 34 is referred to as the antenna wire 34.

One end of the antenna wire 34 is connected to a spool or bobbin 42 (FIGS. 4 and 5) that is rotatably supported within the housing 22. A second end of the antenna wire 34 extends out a small hole 44 in the housing 22. The end of the antenna wire 34 that is connected to the spool 42 is also electrically to the transmit circuitry 32 (schematically illustrated in FIGS. 4 and 5) such that the antenna wire 34 receives the electrical stimulus signal 36 from the transmit circuitry. The electrical connection. through the spool to the transmit circuitry 32 may be made in any suitable manner such as slip rings, etc.

Figure 5:
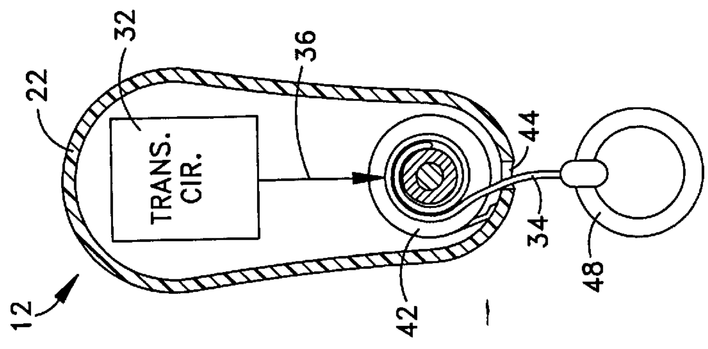
FIG. 5 is a view taken along line 5—5 in FIG. 4.
Figure 4:
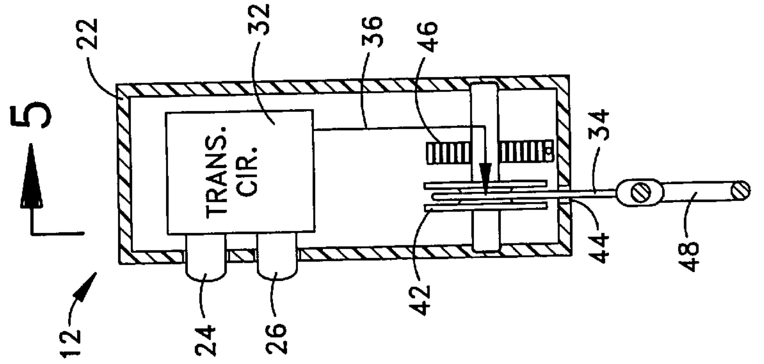
FIG. 4 is a view taken along line 4—4 in FIG. 2, and shows components within a housing of the transmitter of FIG. 2.

A spring 46 (Fig. 4) is operatively connected between the spool 42 and to the housing 22. In one embodiment, the spring 46 is a coil spring. The spring 46 biases the spool 42 toward a neutral or start position (shown in FIGS. 4 and 5), but allows the spool to rotate several revolutions away from the start position against the bias of the spring. The antenna wire 34 is coiled around the spool 42 when the spool is in the start position (FIGS. 4 and 5). The number of antenna turns around the spool 42 depends upon a desired extended length of the antenna wire 34 and the number of wind-up turns permitted by spring 46. In FIGS. 4 and 5, all of the coil turns of antenna wire 34 are not visible due to overlap, etc. The antenna wire 34 extends from the spool 42 and extends from the transmitter housing 22 when the antenna wire 34 is pulled to an extended or actuated position (shown in FIG. 3).

Figure 6:
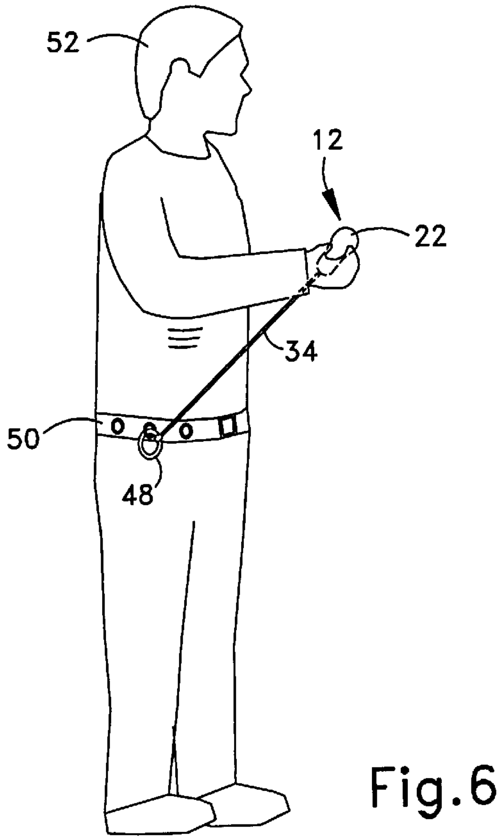
FIG. 6 illustrates a transmitter operator having moved the transmitter of the present invention to an extended, uncoiled position.

A ring 48 is connected to the end of the antenna wire 34 that is not connected to the spool 42 (i.e., the free end). The ring 48 is attachable (FIG. 6) to a clothing article 50 (e.g., a belt) of a transmitter operator 52 (e.g., the owner/operator of the vehicle 16). The transmitter 12 can hang from the clothing article by the ring 48. Also, the attachment of the ring 48 to the clothing article 50 of the transmitter operator 52 provides an anchor point for the free end of the antenna wire 34. It is to be appreciated that another structure could be used at the free end of the antenna wire 34 to permit anchoring and attachment (e.g., a clip or latch).

Figure 2:
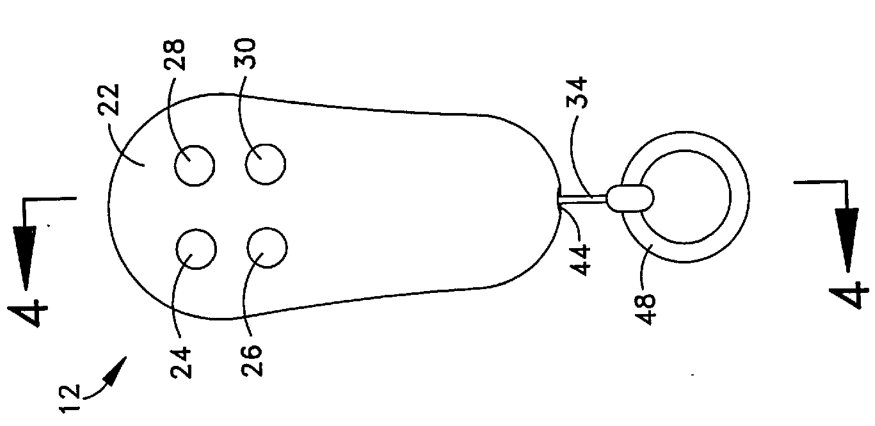
FIG. 2 is a pictorial illustration of the transmitter shown in FIG. 1, and shows an antenna of the transmitter in a stored coiled position.

The transmitter 12 is capable of transmitting the signal 18 while the antenna wire 34 is wound onto the spool 42 (FIG. 2). However, in order to increase the transmission range of the signal 18 without increasing the transmitter power, the antenna wire 34 is withdrawn from the housing 22 to the extended position (FIG. 3), via pulling.

If the ring 48 is attached to the clothing article 50 (FIG. 6) of the transmitter operator 52, the operator grasps the housing 22 of the transmitter 12 and operatively pulls the housing away from the point of ring attachment on the clothing article 50. As the housing 22 is pulled away, the antenna wire 34 extends from the housing against the bias of the spring 46, and the antenna wire is operatively extended. Once the antenna wire 34 is extended, the transmitter operator 52 presses the pushbutton (e.g., 24) associated with the desired remote convenience function (e.g., unlock the vehicle doors). After, the pushbutton (e.g., 24) is pressed, the transmitter operator 52 allows the antenna wire 34 to retract back into the housing 22, under the bias of the spring 46.

It should be appreciated that other manners of withdrawing (and retracting) the antenna wire 34 from the housing 22 can be employed (e.g., pulling the ring 48 with one hand while grasping the housing 22 with the other hand). For any manner of withdrawal of the antenna wire 34, the housing 22 is moved relative to the free end of the antenna 34 (i.e., the end with the ring 48). Either the housing 22 is moved away from the transmitter operator 52, the free end of the antenna wire 34 is moved away from the transmitter operator 52, or both the housing 22 and the free end of the antenna wire 34 are moved relative to the transmitter operator 52. It is to be appreciated that only the relative movement between the housing 22 and the free end of the antenna wire 34 is important to the withdrawal of the antenna wire 34. Further, the concept of "anchoring" the free end is for the relative movement between the housing 22 and the free end of the antenna wire 34. For ease in reference, the free end is "anchored" relative to the housing 22 regardless of whether the antenna free end, the housing, or both move relative to the transmitter operator 52.

From the above description of the invention, those skilled in the art will perceive improvements, changes and modifications. For example, the transmitter housing could be attached to the article of clothing of the transmitter operator and the free end of the antenna wire (i.e., the end with the ring) is pulled away from the transmitter housing. Such improvements, changes and modifications within the skill of the art are intended to be covered by the appended claims.

Having described the invention, the following is claimed:

1. A transmitter unit for a remote control convenience system, said transmitter unit comprising:

a housing;

at least one selector located on the housing and manually actuatable for requesting remote control performance of a function by a remotely located receiver;

transmit circuitry located within said housing operatively connected to said at least one selector for outputting an electrical signal, conveying a message requesting performance of the function, in response to actuation of said at least one selector;

a flexible antenna operatively connected to receive the electrical signal from said transmit circuitry and outputting a signal intended for reception by the receiver and conveying the message requesting performance of the function, said antenna having a stored coiled position inside said housing and an extended position extending outside of said housing; and means for mounting said antenna to said housing permitting withdrawal and retraction of said antenna relative to said housing between the stored coiled position and the extended position;

wherein said means for mounting said antenna includes a spool that is rotatable relative to said housing, said antenna has two ends, one end of the antenna is attached to said spool, and said transmitter unit further including pull means attached to the other end of said antenna so that pulling of said pull means extends the antenna, said pull means is a ring.

2. The transmitter unit as set forth in claim 1, wherein said spool is enclosed within said housing, said housing has a hole, and said antenna extends from said spool through said hole in said housing.

3. A transmitter unit as set forth in claim 1 including means for biasing said spool toward the stored coil position.

4. A transmitter unit for a remote control convenience system, said transmitter unit comprising:

a housing;

at least one selector located on the housing and manually actuatable for requesting remote control performance of a function by a remotely located receiver;

transmit circuitry located within said housing operatively connected to said at least one selector for outputting an electrical signal, conveying a message requesting performance of the function, in response to actuation of said at least one selector;

a flexible antenna operatively connected to receive the electrical signal from said transmit circuitry and outputting a signal intended for reception by the receiver and conveying the message requesting performance of the function, said antenna having a stored coiled position inside said housing and an extended position extending outside of said housing; and means for mounting said antenna to said housing permitting withdrawal and retraction of said antenna relative to said housing between the stored coiled position and the extended position;

wherein said means for mounting said antenna includes a spool that is rotatable relative to said housing, said antenna has two ends, one end of the antenna is attached to said spool, and said transmitter unit further including pull means attached to the other end of said antenna so that pulling of said pull means extends the antenna, said pull means includes means for attachment of said pull means to an article of clothing.

5. The transmitter unit as set forth in claim 4, wherein said spool is enclosed within said housing, said housing has a hole, and said antenna extends from said spool through said hole in said housing.

6. The transmitter unit as set forth in claim 5 including means for biasing said spool toward the stored coil position.

7. A method of requesting remote control performance of a convenience function by a receiver, said method comprising:

anchoring a pull element of a remote control transmitter;

grasping a housing of the transmitter;

pulling the pull element relative to the housing so that the housing and the pull element relatively move apart so as to extend a stored coiled antenna that has one end connected to the anchored pull element;

actuating a selector located on the housing that corresponds to the desired remote convenience function; and transmitting, in response to the actuated selector, from the extended antenna a signal from the transmitter intended for the receiver that conveys a message requesting performance of the remote convenience function;

wherein said step of anchoring a pull element includes attaching the pull element to an article of clothing.

8. The method as set forth in claim 7, wherein the step of pulling includes rotating a spool that hold coils of the antenna relative to the housing.

9. The method as set forth in claim 7, wherein said step of pulling the pull element includes pulling the antenna through a hole in the housing.

10. The method as set forth in claim 7 further including the step of biasing said spool against said rotation.

* * * * *

UNITED STATES PATENT AND TRADEMARK OFFICE

CERTIFICATE OF CORRECTION

PATENT NO. : 6,025,786

DATED : February 15, 2000

INVENTOR(S) : Joan F. Rayford

It is certified that error appears in the above-indentified patent and that said Letters Patent is hereby corrected as shown below:

Column 6, line 3, change "1" to --2--

Column 6, line 61, change "7" to --8--

Column 6, line 64, change "7" to --8--

Signed and Sealed this

First Day of May, 2001

*Attest:*

Nicholas P. Godici

NICHOLAS P. GODICI

*Attesting Officer*

*Acting Director of the United States Patent and Trademark Office*